United States Patent [19]

Neeley et al.

[11] Patent Number: 5,164,575
[45] Date of Patent: Nov. 17, 1992

[54] BLOOD SAMPLING PROCEDURE AND APPARATUS

[76] Inventors: William E. Neeley, 22 High View Rd.; William W. Jones, 6 Juniper La., both of Madison, Conn. 06443

[21] Appl. No.: 689,476

[22] Filed: Apr. 23, 1991

[51] Int. Cl.⁵ .................... G06K 7/10; G06F 15/24
[52] U.S. Cl. .................... 235/472; 235/385; 235/462; 283/81
[58] Field of Search ............ 235/472, 462, 385; 283/81; 221/2; 422/63

[56] References Cited

U.S. PATENT DOCUMENTS

| | | | |
|---|---|---|---|
| 3,831,006 | 8/1974 | Chaffin, III et al. | 235/375 X |
| 4,519,522 | 5/1985 | McElwee | 221/13 |
| 4,563,739 | 1/1986 | Gerpheide et al. | 235/385 |
| 4,678,894 | 7/1987 | Shafer | 235/462 |
| 4,734,713 | 3/1988 | Sato et al. | 235/487 |
| 4,853,521 | 8/1989 | Claeys et al. | 235/462 |
| 4,857,716 | 8/1989 | Gombrich et al. | 235/472 |
| 4,967,928 | 11/1990 | Carter | 221/2 |

Primary Examiner—Eugene R. LaRoche
Assistant Examiner—Christopher R. Glembocki
Attorney, Agent, or Firm—William W. Jones

[57] ABSTRACT

Patients in hospitals are provided with identification bracelets which display a patient identity number in a machine-readable form, such as a bar code. Blood or other samples are taken at bedside from patients by a technician, nurse, or the like who carries a microprocessor-operated device which optically scans the coded patient identification bracelet. When the patient ID bracelet is read, the device lists the different blood tubes that are to be filled on a display screen. The device has a fixedly mounted onboard scanner which scans a preprinted bar code on the specimen tube which bar code identifies the type of tube being used. Just before, or after, the specimen is drawn, the tube is read by the onboard scanner, and a label is printed and placed on the tube, which label includes the patient's name; the patient's I.D. number; the tests to be performed on the specimen sample; the time and date the specimen was drawn; and the size and type of tube. The wrist band barcode ensures that the correct patient is being sampled, and the tube bar code ensures that the specimen drawer does not put the specimen label on the wrong tube.

13 Claims, 3 Drawing Sheets

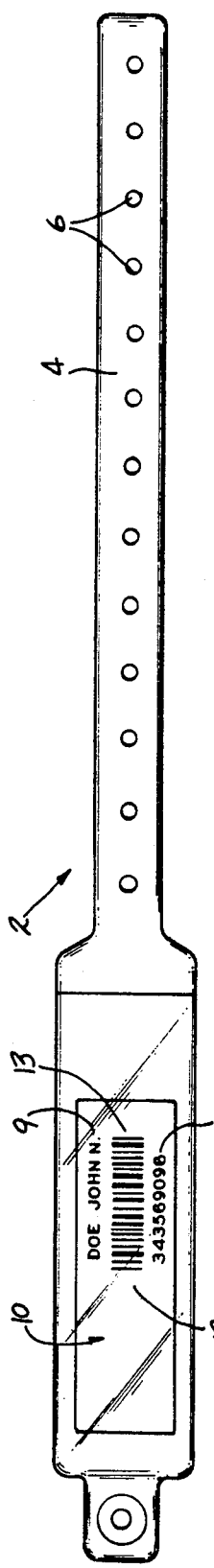
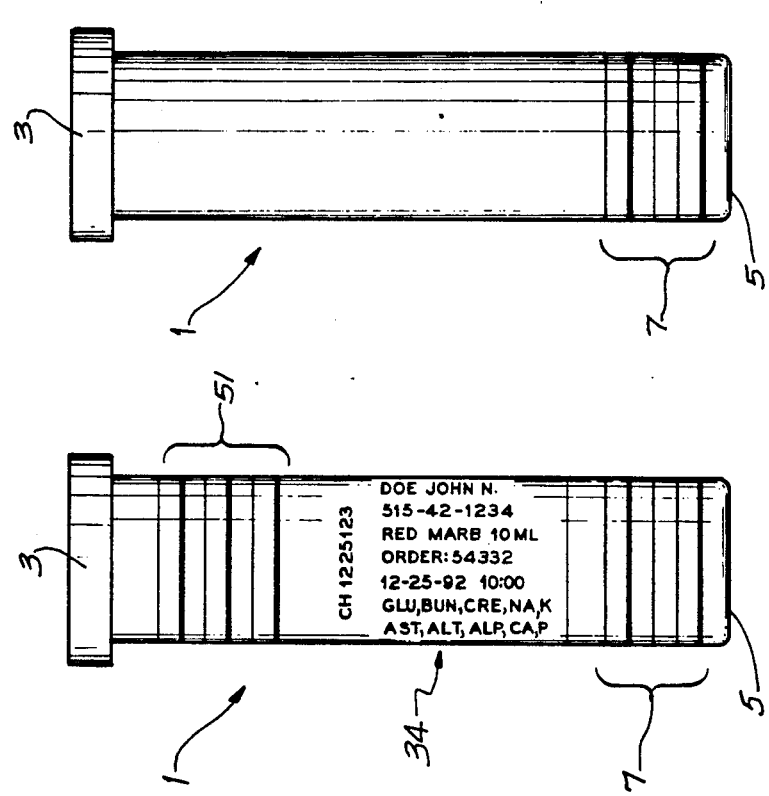
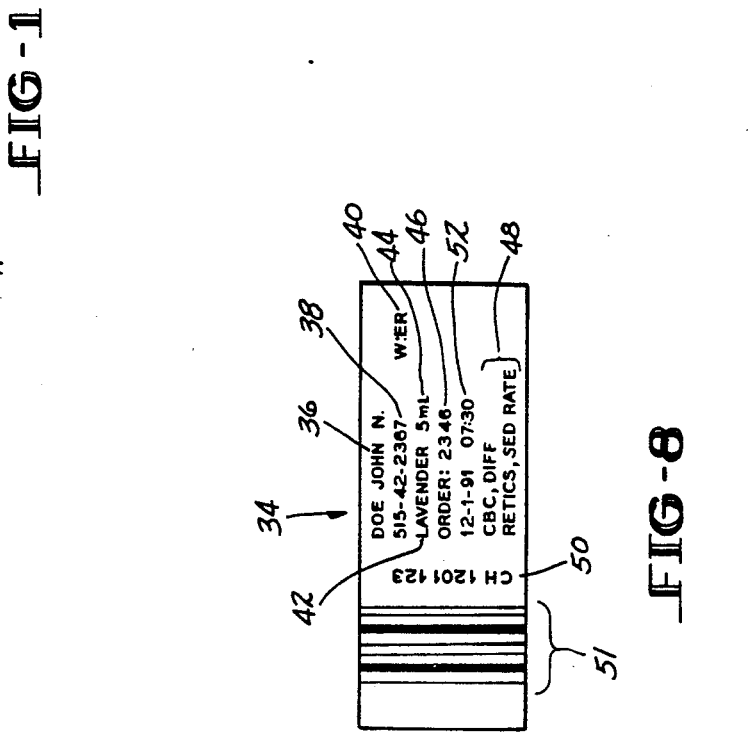

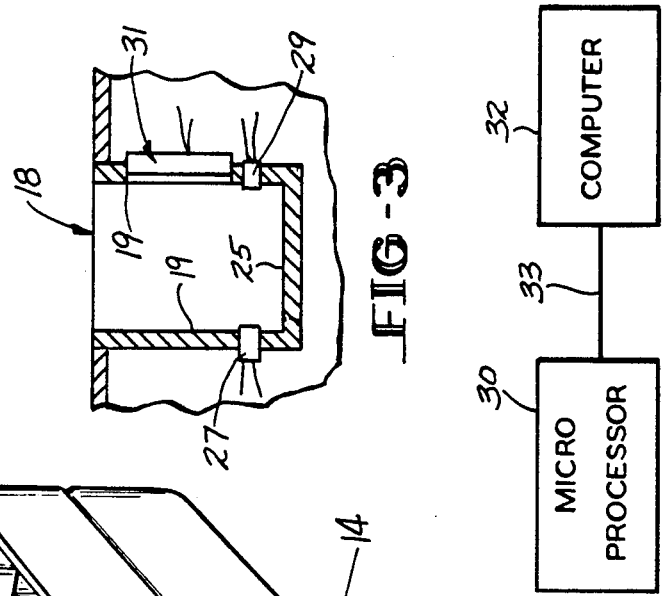
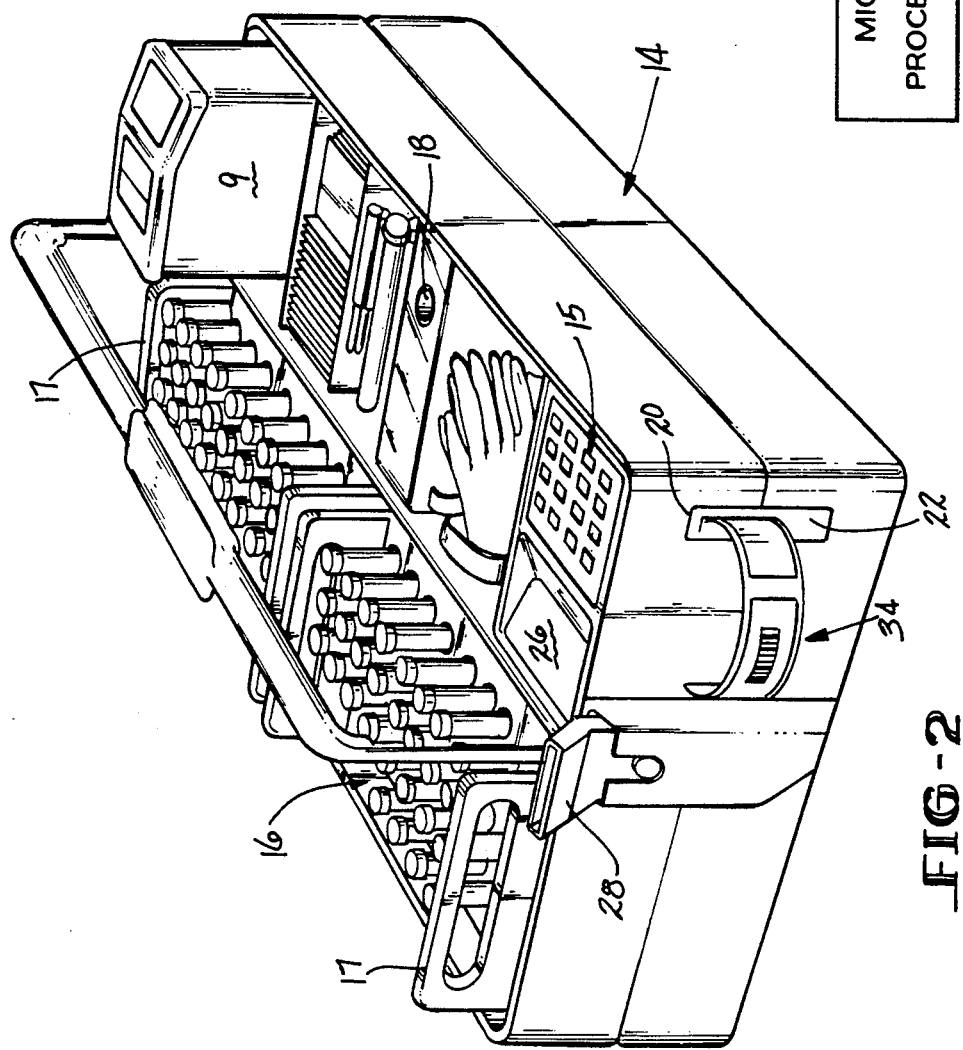

BLOOD SAMPLING PROCEDURE AND APPARATUS

FIELD OF THE INVENTION

This invention relates to an improvement in hospital, or the like, procedures for drawing patient speciman samples, wherein a positive identification of the patient, the specimen testing instructions, and the specimen tube, are provided when the specimen is taken.

DESCRIPTION OF RELATED ART

The prior art, as exemplified by U.S. Pat. No. 4,835,372 granted May 30, 1989 to Gombrich et al, and others, have recognized to some extent the problems which can occur in a hospital relative to identifying patients and matching medications and specimen samples to the proper patients. A common thread running through all of the solutions to the aforesaid problem involves providing the patient with a bar coded identification number, typically the patient's social security number, which is placed on a wrist band worn by the patient, or on some other item which accompanies the patient throughout the hospital. Removable supplemental bar coded labels have been suggested for example, for attachment to the patient's wrist band, or to the patient's chart. This first number will identify the patient when entered into hospital computer system. At the same time, a second bar coded number unique to the patient will be assigned to the patient for securement to the medication and specimen vials. This second number is an accession number which the hospital computer uses to identify not only the patient's name, but also the medications, laboratory tests, patient's medical history, billing history, and the like. Thus the hospital computer relates two separate and different numbers to the same patient.

This system is used by the Gombrich et al reference to match patients, their medications, and specimen tests. In Gombrich et al, the patient is given a wrist band with the first bar code number on it, and the medication vials for the patient are labeled in the pharmacy with the second bar coded number. Specimen vials for the patient are provided with the second bar coded numbers in the lab before specimen sampling rounds are taken. In both medication and specimen sampling rounds, the nurse or technician will take the medication or test specimen vials to the bedside, and use a portable scanner to scan the patient's wrist band, and then scan labels on the vials until a match is found. The scanner communicates with a central computer in the hospital by means of RF transceivers and hospital phone or power lines. The Gombrich et al procedure is cumbersome, not readily amenable to existing hospitals, and the use of RF transmissions in a hospital may involve some risk to other equipment in the hospital wards, emergency rooms, intensive care, and the like.

Gombrich et al thus addresses to some extent patient identification and hospital procedure matching problems, and offers an awkward and possibly risky solution thereto.

Copending U.S. patent application Ser. No. 07/410,144, filed Sep. 20, 1989 by W. E. Neeley discloses a procedure and assembly for drawing blood which involves the use of a portable instrument, as for example a specimen sampling tube tray, which has an onboard microprocessor which stores and uses information from the main hospital computer. An onboard label printer is also included in the instrument. The microprocessor is connected to and operates the printer. A bar code scanner is also mounted in the instrument and connected to the microprocessor. The scanner is used to scan a patient's wrist band at bedside. The scanned bar code tells the microprocessor who the patient is, and the microprocessor causes the printer to print a label at the bedside. The label will include the patient's printed accession number in bar code and alphanumeric form, and the patient's name, specimen testing instructions, and the time and date the specimen is drawn; the latter all being printed in human readable alphanumeric indicia.

The aforesaid Neeley system solves many problems and eliminates much opportunity for human error, since the chance of mislabeling the vials or tubes is substantially reduced.

SUMMARY OF THE INVENTION

There is one additional area wherein human error can still occur, and does occur frequently in the modern hospital environment. On average, at least two to three different blood specimens are drawn in different tubes every time blood is taken from a patient. The different tubes are distinguished by having different colored stoppers. The tubes contain different reagents, such as anticoagulants, or preservatives. In certain cases, the tubes will contain no reagents. The presence or absence of reagents in the tubes is directly related to the tests to be performed.

As noted above, in some hospitals, the blood drawer (phlebotomist, or sampler) will place hand written labels on the tubes. In more modern hospitals and clinics, blood tube labels are printed by the hospital or lab computer system, and then after the labels are reviewed by the blood or other specimen drawer at bedside, the drawer must select the correct labels for placement on each of the different tubes. The aforesaid procedure sounds simple enough, but in reality it is boring, and is repeated many times each day, often under poor lighting conditions found at bedside. The requirement that the specimen drawer correctly match the tube stopper color with the proper label invites human error. Thus human errors can, and do, arise in a system where the tolerable error rate is zero.

In most cases, the accession number on each of the labels is different for each blood tube type, and patient, and must be carefully matched with each particular tube type for each patient. Currently, a hospital or other health care provider, is totally dependent on the blood drawer's ability to sort through multiple labels and make the correct tube type-label match decisions. Until now, there have not been any practical procedures to avoid the tube-label mismatch errors noted above, other than by totally depending on the blood drawer's decision-making ability, and eyesight, to assure that the correct labels are placed on the correct tubes.

A hospital laboratory is typically divided into a number of different testing areas, as for example: a blood chemistry area; an hematology area; a coagulation area; and the like. Each of the different areas in the lab defines where the respective tests will be performed. In the case of blood specimens, the tubes destined for the different testing areas in the lab will be identified by the different colored stoppers, such as: lavender; red; blue; green; gray; and the like. In the sample processing area in the lab, some of the specimen tubes may be centrifuged, and their stoppers removed before they get to the testing areas where the testing instruments will read the tube bar codes. At present, the only way the lab technician will know where the tubes are to go in the lab is by the color of the stoppers, if they are still on the tubes, or by the labels on the tubes.

Since the different stopper colors are coded to reagents which are pre-loaded in the associated tubes, it is readily apparent that the specimen drawer must place the correct specimen label on the correct specimen tube, bearing in mind, as noted above, that the specimen label may be the only indication to lab personnel as to where in the lab the specimen test is to be performed.

For example, if a label specific to a lavender (or other color) stopper tube containing EDTA (or other appropriate reagent) were placed on a red stopper tube by the lab personnel, or by the drawer, the error might, or might not be identified in the lab. If the error were noted in the lab, then the specimen drawer would be sent back to the patient's bedside, or the patient would be called in from home, to then be stuck again to obtain the specimen in the correct tube.

If the error were not detected in the lab, and if the blood tube were to have a label with the correct name, but with an incorrect lab accession number for the tube on question placed on the label, then the wrong test would be performed on the sample in the tube, and the test could be matched by the computer to a patient who corresponds to the accession number on the label, but whose blood specimen is not the specimen which was tested; but the hospital computer would not know of the error because the computer would identify the test to be performed, and the patient, by the accession number on the tube. Thus the present protocol for lab test identification and matching of specimen tubes to patients still leaves an unacceptable margin for error.

This invention provides a definitive solution to the problem of tube mis-identification with an improvement to the above-identified Neeley blood drawing instrument which improvement substantially eliminates specimen tube labeling errors. This invention will provide assurance that the correct label will be placed on the correct specimen tube at the time the specimen is drawn.

The solution to the problem involves placement of a bar coded number on the specimen tube at the time of manufacture, or at a later time, but before the specimens are drawn; which bar coded number identifies the type of tube, and therefore the types of tests to be performed on the specimen drawn in the tube (since more than one test can be performed on specimens in certain of the tubes); and which bar coded number must be scanned by an auxiliary scanner in the instrument before the label can be printed at bedside. The drawer will take the tubes to the patient's bedside, and the tubes will have labels or other indicia thereon which display the unique number bar codes, which bar codes identify the type of tube, and therefore the types of tests to be performed on the specimen which will be drawn into the tube. Thus the stopper color, i.e., red stopper, lavender stopper, blue stopper, etc. will be identified by the tube identifier label. The tube identification bar code will be physically placed on the tube in a location which is offset from the location at which the bedside-printed label is to be affixed to the tube by the specimen drawer.

Preferably the tube identification bar code will consist of a series of concentric circles, and will be placed at the bottom of the tube, remote from the printed label that is subsequently affixed to the tube at bedside.

The tray or instrument will be provided with a well in which the auxiliary bar code scanner is located, and into which the bottom of the specimen tube can be placed. The tube identification bar code scanner will be connected to the onboard microprocessor, and will tell the onboard microprocessor which type of tube is in the well and is next to be used to draw a sample; and therefore, which type of test is to be performed on the specimen sample in the subject tube. The tube identification scan is only one critical step which enables automatic operation of the onboard printer to produce the correct specimen label for the specimen tube. The other critical step needed to enable automatic label printing is the scan of the patient wrist band. After both scans are made, and only when both scans identify the same patient being sampled, then the proper label will be automatically produced by the onboard label printer.

It is therefore an object of this invention to provide an improved substantially error-proof procedure for taking patient samples in a hospital, or the like, environment.

It is a further object of this invention to provide an improved procedure of the character described which substantially eliminates the chances of improperly labeling the specimen tube.

It is an additional object of this invention to provide an improved procedure of the character described wherein the specimen tube labels are printed at the time of taking the specimens.

It is another object of this invention to provide an improved procedure of the character described wherein specimen tube, patient identification, and test instruction information to be printed on the specimen sample labels is produced by scanning machine-readable indicia on a patient's hospital ID wrist band, and also scanning machine readable indicia on the specimen tube, thereby triggering a bedside microprocessor to print a specimen tube label at the patient's bedside.

These and other objects and advantages of the invention will become more readily apparent from the following detailed description of a preferred embodiment thereof when taken in conjunction with the accompanying drawings in which:

FIG. 1 is a plan view of a hospital patient identification bracelet adapted for use in practicing this invention;

FIG. 2 is a perspective view of a blood specimen tube microprocessor-printer-scanner tray assembly employing this invention;

FIG. 3 is a sectional view of the tube scanning well in the tray;

FIG. 4 is a side elevational view of an evacuated specimen tube which has disposed thereon machine readable coded indicia which identifies the type of, and size of the tube, ie a specimen tube ID label;

FIG. 5 is a view similar to FIG. 4 but showing a printed patient and specimen test instruction label for a red marble stopper affixed thereto adjacent to the specimen tube ID label;

FIG. 7 is a schematic illustration of the connection between the tray microprocessor and a hospital mainframe or laboratory computer; and FIG. 8 is a plan view of a patient and specimen test instruction label for a lavender stopper for affixation to the tube, which label is printed at bedside by the device of this invention.

Figure 6:
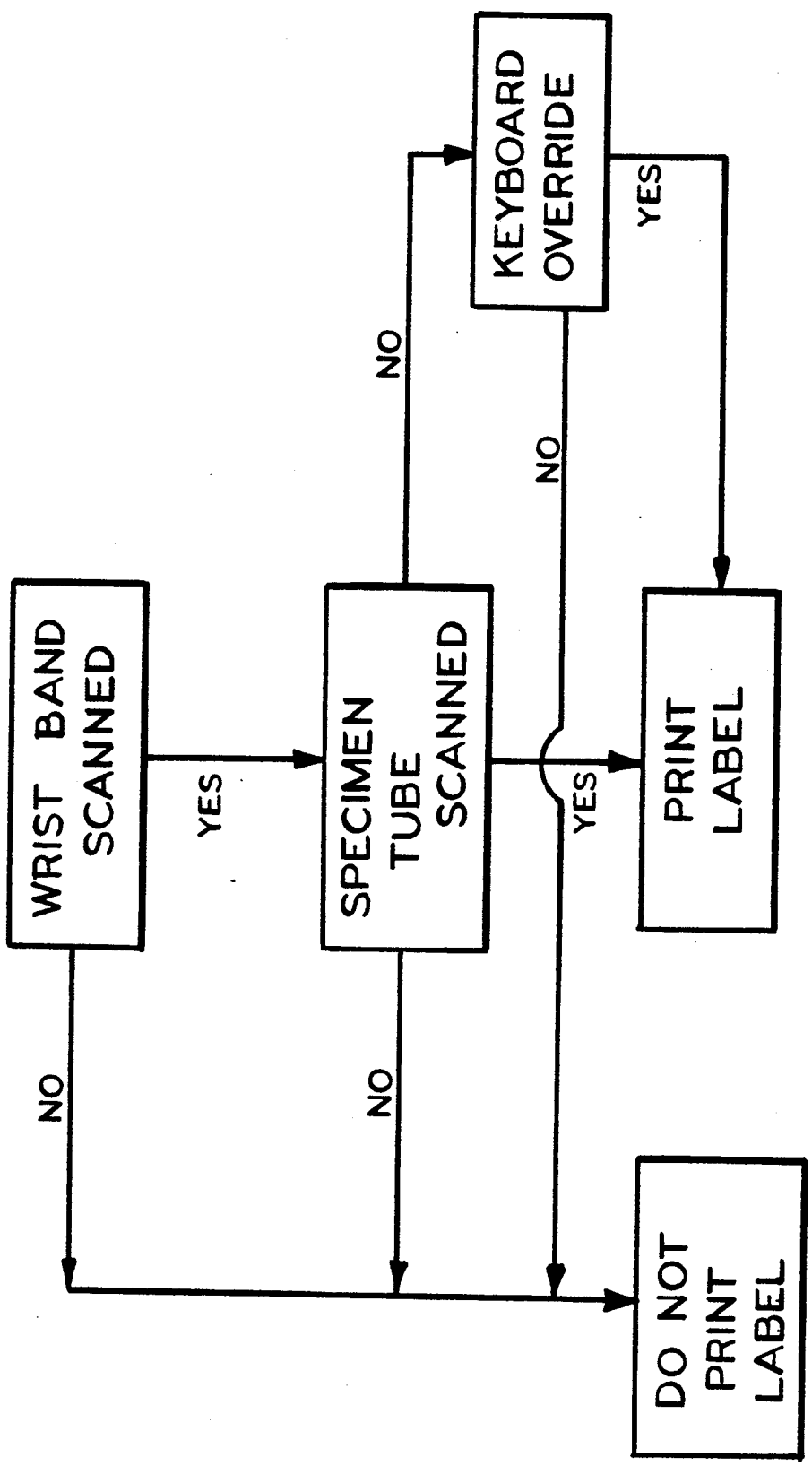
FIG. 6 is a software flow chart by which the tray microprocessor determines whether to print a specimen testing label or not.

Referring now to FIG. 1, there is shown a conventional hospital patient ID bracelet 2 which includes a strap portion 4 having serial apertures 6 for receiving a snap fastener 8 on the end of the bracelet 2. A pocket pouch 10 on the bracelet receives a patient identification slip or tag 12 having the patient's name 9 printed on it, and having the patient's hospital identification number printed on it, both in alphanumeric form 11, and also in a machine-readable form such as a bar code 13. All of the patient's records in the hospital will be in part catalogued and identified by this patient hospital identification number.

Referring to FIGS. 2 and 3, there are shown details of a blood sampling tray which has been adapted to operate in accordance with this invention. The tray 14 includes a portion 16 thereof which is adapted to receive a plurality of specimen sampling tube racks 17 therein. A needle discard receptacle 9 is included in the tray 14. A specimen tube label printer 20 is built into the tray 14. The printed specimen tube labels are ejected from the printer 20 via slot 22. It will be understood that the label printer 20 is preloaded with a roll of blank labels which are precoated with an adhesive and adhered to a non-bonding strip of material, such as waxed paper, or the like. The labels thus can be readily peeled from the waxed paper strip. The printer 20 is controlled by a microprocessor housed in the tray 14. The tray has a liquid crystal display 26 which will specify to the specimen drawer the numbers and types of specimen tubes, which are to be used to take specimens from the patient after the wrist band has been scanned.

The tray 14 also has a keyboard 15 which is linked to the microprocessor. The keyboard 15 can be used for many functions, one of which is to allow a patient specimen test instruction label to be printed for use on a specimen tube which is either a size other than that specified or a specimen tube which has no tube identification number preprinted thereon. These changes would require a manual override by the drawer. The need to use such an override could arise were the drawer to run out of a certain type, or size, tube before the necessary specimens had all been drawn. For example: if all of the 5 mL prelabeled red stoppered tubes had been used before all of the 5 mL specimens had been drawn, the drawer could draw the specimen in a prelabeled 7 mL, or 10 mL, red stoppered tube by keying a pre-identified override code into the microprocessor with the keyboard, and then scanning the 7 mL red stoppered tube to produce a patient identification label from the printer. If only non-labeled 5 mL red stoppered tubes are available, then a more complicated series of pre-identified override codes could be keyed in by the drawer, to allow a patient identification label to be printed. In this manner, the drawer cannot accidentally draw and label a patient specimen in a nonlabeled tube. Labeling the specimen in such a tube or in an improper sized tube can only be done by the drawer intentionally, by overriding the microprocessor lockout with the keyboard, to permit the onboard printer to print a patient and specimen test instruction label despite the use of a non-recognized tube.

The keyboard can also be used by the drawer to input instructions to the microprocessor to reprint a previously printed label. This option is useful when the drawer will have affixed a bedside printed specimen label to one of the evacuated tubes, and then been unable to properly draw the blood sample for failure to find a vein, whereupon the vacuum in the tube has been lost. In such a case the labeled empty tube must be discarded whereby the label is effectively lost. It is practically impossible to remove an adhered label from one tube and then re-adhere it to another tube. In such a case, a reprint key on the keyboard may be pressed and a replacement tube scanned to obtain a second label identical to the lost label.

A hand held bar code scanner 28 is operably connected to the tray microprocessor. The scanner 28 is preferably a laser or charge-coupled device scanner which is adapted to read the patient's ID bracelet which, due to the fact that it is worn on an irregular surface, i.e. one's wrist, is difficult for a conventional wand scanner to read.

Referring to FIG. 3, details of the tube scanning well 18 are shown. The well 18 is sized to receive the bottom of the specimen tube, which tube will be discribed hereinbelow. The well 18 has a side wall 19 which has a first pair of diametrically opposed apertures 21 near the bottom wall 25 of the well 18; and a scanning aperture 23. A light emitting diode (LED) 27 is positioned behind one of the first aperture pair; and a light detector 29 is positioned behind the second one of the first aperture pair. An optical scanner 31 such as a CCD is positioned behind the scanning aperture 23. The LED 27 and detector 29 provide a light path barrier which detects when a specimen tube is inserted into the well 18. When a tube breaks the aforesaid light path, the scanner 31 will be energized so as to be operable to scan the specimen tube bar code, described hereinafter. The LED 27 and detector 29 are low power components, such as a low power light emitting diode and a phototransistor detector.

When the bar code on the bottom of each tube is scanned, a single high pitch sound burst will be made by the tray computer to signal the drawer that a valid scan has been made; and a low pitch double sound burst will indicate an invalid scan whereupon re-scanning the tube will be necessary. Normally, however, the scanner 31 will be deenergized to conserve power usage in the tray 14.

Referring now to FIGS. 4 and 5, a specimen sampling tube employing the invention is shown. The tube is designated by the numeral 1. The tube 1 is preferably internally evacuated, and has its open end closed by an elastomeric stopper 3. A non-evacuated tube such as used in certain areas of the world could also be used. The bottom 5 of the tube 1 has an integral end closure wall. A tube-identifying bar code 7 is disposed on the tube 1 closely adjacent to the bottom 5 thereof. The bar code 7 extends completely around the tube 1 so that it can be scanned from any direction in the tray scanner well 18. Thus no particular orientation of the tube 1 in the well 18 is necessary. The bar code 7 identifies the tube type and the tube size for the microprocessor. By "tube type" is meant what type of additive, i.e., EDTA; citrate; etc, or no additive, is incorporated into the tube 1. Thus the bar code 7 identifies the reagents and like contents of the tube 1, and the color of the tube stopper. FIG. 4 shows the tube as it is presented to the specimen drawer. The bar code 7 is preferably placed on the tube 1 by the manufacturer. FIG. 5 shows the tube 1 after the specimen label 34 has been printed and affixed to the tube at bedside. One edge of the label 34 is positioned so as to abut the stopper 3. This places the bar coded patient accession number 51 in the proper place to be scanned by the automatic laboratory specimen testing equipment contained in modern hospitals.

FIG. 6 shows the logic used by the microprocessor to determine whether or not to print a specimen testing label.

Interfacing both of the scanners 28 and 31 with the microprocessor enables the microprocessor to identify the patient and also the specimen tube type, and thereafter, only when both identification have been made, enable the printer 20 to print the proper label with: correct patient identification; patient accession number; testing instructions; date and time; and tube ID indicia, for placement on the specimen tube.

A battery power pack is disposed in the tray for powering the scanners, microprocessor, and printer. The power pack may be rechargeable.

Intercommunication between the tray microprocessor and a central hospital or laboratory computer, is shown in FIG. 7, wherein the tray microprocessor is denoted by the numeral 30, the computer (hospital or laboratory) by the numeral 32 and the interface connection by the numeral 33. The computer 32 can thus program the tray microprocessor 30 as to which patients are to be sampled; what tests are to be performed on the samples taken from the respective patients; and what specimen tubes are to be used. Additionally, the tray microprocessor 30 can confirm to the central or laboratory computer 32, after the samples are taken, that the sampling instructions were carried out.

FIG. 8 shows a typical specimen tube label 34 produced by the printer 20 after the ID bracelet tag 12 and specimen tube ID label have been scanned. The label 34 displays the patient's name 36; ID number 38; the patient ward location 40; the tube type 42; the specimen volume 44; the patient order number 46; the tests to be performed 48; the patient test accession number in alphanumeric form 50 and in bar code form 51; and the time and date the specimen is drawn 52.

It will be readily appreciated that this invention provides for safer, more accurate, specimen sampling of patients. The microprocessor label printer may be obtained from Pitney Bowes Corporation. The ID bracelet scanner can be obtained from Opticon, Inc. While the invention has been described in connection with the taking of blood samples from hospital patients, it will be readily appreciated that it can be used in connection with other specimen sampling of patients in other environs, such as clinics, physician's offices, sanitariums, or the like. Likewise, the invention can be performed with other forms of machine readable means, such as a magnetically coded bracelet which can be scanned by a magnetic scanner The invention allows the person who draws the samples to become markedly less involved in the reliability of the sampling.

Since many changes and variations of the disclosed embodiment of the invention may be made without departing from the inventive concept, it is not intended to limit the invention otherwise than as required by the appended claims.

What is claimed is:

1. A portable device for use in biological fluid specimen gathering in specimen tubes which tubes are provided with first machine readable indicia which identifies a specific test type of a plurality of specimen test types to be performed on a specimen drawn into the tubes, each test having a different identifying indicia, said device including an onboard power source; an onboard microprocessor; an onboard label printer; an onboard scanner means for scanning the first indicia on the tubes and for scanning patient-specific machine readable second indicia associated with each patient to be tested; said microprocessor being programmed with specimen tube identification information, with patient identification information, and with specimen testing information which identifies which tests are to be performed on specimens taken from each patient; said microprocessor being operably connected to said scanner means, and to said printer to operate the latter; said printer being operable to print a specimen tube label containing patient identification and specimen testing information in both alphanumeric and machine readable form, after said scanner means have enabled said microprocessor to identify each of: the specimen test types for the tube being used; the specimen test to be performed; and the patient from whom the specimen is being drawn and said microprocessor has verified that the scanned tube is usable with the specific test identified in the spectrum testing information of each patient.

2. The device of claim 1 further comprising specimen tube holder means for containment of a plurality of specimen tubes.

3. The device of claim 1 wherein said scanner means comprises a first scanner disposed in a well in said device which well is sized to receive a bottom end portion of each specimen tube upon which said first machine readable indicia are placed.

4. The device of claim 3 further comprising switch means in said well for selectively energizing said first scanner when a specimen tube is inserted into said well.

5. The device of claim 4 wherein said switch means is disposed nearer to a bottom wall of said well than said first scanner to ensure proper positioning of said first indicia relative to said first scanner prior to energizing the latter.

6. The device of claim 1 further comprising display means operably connected to said microprocessor for visually indicating the number and types of tests to be performed on specimen samples, after the patient being sampled is identified by said microprocessor by said scanner means.

7. The device of claim 1 further comprising keyboard means operably connected to said microprocessor for use by a specimen drawer to manually signal said microprocessor that an unmarked tube will be intentionally used to draw a specimen whereafter said printer will be able to print a proper label for placement on said unmarked tube.

8. The device of claim 7 wherein said keyboard is manually operable by a specimen drawer to enable said microprocessor and printer to reprint a previously printed label in the event that the specimen drawer fails to successfully draw a speciment into a tube bearing the previously printed label.

9. A method for use by a medical specimen drawer in identifying and labeling biological fluid specimen sampling tubes while gathering patient specimens, said method comprising the steps of:
   a) providing a portable device with an onboard power supply; an onboard microprocessor for driving an onboard label printer; and onboard scanner means for separately inputting specimen tube and patient identity information into said microprocessor;

b) providing specimen sample tubes of various types which are prelabeled with first machine readable indicia which are specific to the tests which may be performed on a sample placed in the tube, said first indicia being non-patient specific such that said tubes can be used to draw specimens from any patient who is scheduled for a particular test to which the indicia are specific;

c) scanning said first indicia with said onboard scanner means to identify for said microprocessor which type of tests may be performed on the specimens placed in the tube being used by the specimen drawer;

d) scanning a patient-specific machine readable indicia with said onboard scanner means to identify for said microprocessor the patient being sampled; and e) printing a specimen tube label responsive to said two scanning steps, when the scanned specimin tube is usable with the particular test to be performed on the patient's specimin, the label specifying the patient; the tube type; and the tests to be performed on the specimen in both alphanumeric and machine readable forms.

10. The method of claim 9 wherein said first indicia identifies the color of a stopper closing the tube being used.

11. The method of claim 9 comprising the alternate step of manually keying instructions into said microprocessor which allows the drawer to intentionally use a non-prelabeled specimen tube and permit printing of said specimen tube label after scanning only the patient-specific indicia.

12. The method of claim 9 comprising the alternate step of manually keying instructions into said microprocessor which allows the drawer to reprint a label identical to one previously printed.

13. The method of claim 9 comprising the further step of visually indicating alphanumerically on a screen on the device the number and types of specimen tubes to be used on a particular patient, after the patient-specific indicia have been scanned, to inform the drawer which specimen tubes are to be used to draw specimens from the patient being sampled.

* * * * *

UNITED STATES PATENT AND TRADEMARK OFFICE
CERTIFICATE OF CORRECTION

PATENT NO. : 5,164,575
DATED : Nov. 17, 1992
INVENTOR(S) : William E. Neeley et al It is certified that error appears in the above-identified patent and that said Letters Patent is hereby corrected as shown below:

In the Abstract, in lines 10 and 14, please change "onboard" to --on board--.

Col. 1, lines 67 and 68, please change "onboard" to --on board--;
in Col. 3, line 26, please change "on" to --in--;
in Col. 4, lines 7, 8, 13 and 19, please change "onboard" to --on board--; and
in Col. 5, line 63, please change "onboard" to --on board--.

In the Claims, in Claim 1, lines 7, 8 and 9, please change "onboard" to --on board--; and
in Claim 9, lines 6, 7, 19 and 25 please change "onboard" to --on board--.

Signed and Sealed this

Twenty-ninth Day of May, 2001

Attest:

NICHOLAS P. GODICI

*Attesting Officer*    *Acting Director of the United States Patent and Trademark Office*